US009078030B2

(12) United States Patent
Kuo

(10) Patent No.: US 9,078,030 B2
(45) Date of Patent: Jul. 7, 2015

(54) GRAPHICAL USER INTERFACE (GUI) CONTROL BY INTERNET PROTOCOL TELEVISION (IPTV) REMOTE INTERNET ACCESS DEVICES

(75) Inventor: Jenke Wu Kuo, San Diego, CA (US)

(73) Assignee: SONY CORPORATION, Tokyo (JP)

(*) Notice: Subject to any disclaimer, the term of this patent is extended or adjusted under 35 U.S.C. 154(b) by 156 days.

(21) Appl. No.: 13/048,033

(22) Filed: Mar. 15, 2011

(65) Prior Publication Data

US 2012/0240161 A1    Sep. 20, 2012

(51) Int. Cl.
    *H04N 21/4227* (2011.01)
    *H04N 21/47* (2011.01)

(52) U.S. Cl.
    CPC ........... *H04N 21/4227* (2013.01); *H04N 21/47* (2013.01)

(58) Field of Classification Search
    USPC ......... 725/37–39, 51; 345/158, 160, 161, 619
    See application file for complete search history.

(56) References Cited

U.S. PATENT DOCUMENTS

2008/0120668 A1    5/2008    Yau
2009/0125953 A1*   5/2009    Porter et al. .................. 725/109
2011/0109619 A1*   5/2011    Yoo et al. ...................... 345/419
2011/0267291 A1*   11/2011   Choi et al. .................... 345/173
2011/0310796 A1*   12/2011   Um et al. ...................... 370/328
2012/0147022 A1*   6/2012    Roberts et al. ................ 345/540

OTHER PUBLICATIONS

EFO Internet brochure for Wireless Handheld Keyboard—product launch date Sep. 2009, downloaded from the internet on Jun. 29, 2010 from: http://hardwarebistro.com/index.php?option=com_simple_review&Item id=84&review=137-efo-Wireless-Handheld-Keyboard-Review, 6 pages.
Lee, J. et al.—"Pointing devices in IPTV environment"—Proc. of the 2009 Int. ASDR conf., Seoul, South Korea, Oct. 21, 2009, pp. 1-4.

* cited by examiner

*Primary Examiner* — Kieu Oanh T Bui
(74) *Attorney, Agent, or Firm* — John P. O'Banion

(57) ABSTRACT

An Internet protocol television (IPTV) system is driven by a graphical user interface (GUI) controlled by an input device attached to an Internet access device that in turn connects to the GUI over IPTV connections. The input device may be a keyboard, smart phone, iPad, mouse, personal computer, laptop, touch screen, or other generic universal serial bus (USB), IEEE 1394 (FireWire), or other connected device. Connection between the input device and the GUI may be either wired (including, but not limited to USB, IEEE 1394, and Ethernet) or wireless (including, without limitation, infrared (IR), radio frequency, or other form of electromagnetic transmission). Regardless of connection method, the input device acts to operate and command the IPTV GUI so as to navigate and control the IPTV. By appropriate GUI implementations, a single input device may be configured to operate one or more windows on one or more display via IPTV connections.

7 Claims, 3 Drawing Sheets

GRAPHICAL USER INTERFACE (GUI) CONTROL BY INTERNET PROTOCOL TELEVISION (IPTV) REMOTE INTERNET ACCESS DEVICES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to remote controlled displays, and more particularly to displays controlled by using a graphical user interface (GUI) from an Internet access device via an Internet protocol television (IPTV) connection.

2. Description of Related Art

Internet Protocol television (IPTV) is a system through which Internet television services are delivered using the architecture and networking methods of the Internet Protocol Suite over a packet-switched network infrastructure, e.g., the Internet and broadband Internet access networks, instead of being delivered through more traditional radio frequency broadcast, satellite signal, and cable television (CATV) formats.

IPTV services may be classified into three main groups: live television, with or without interactivity related to the current TV show; time-shifted programming: catch-up TV (replays of a TV show that was broadcast hours or days ago), start-over TV (replays the current TV show from its beginning); and video on demand (VOD): browse a catalog of videos, not related to TV programming.

BRIEF SUMMARY OF THE INVENTION

An aspect of the invention is a display, which may comprise: a display device with an Internet access through an Internet Protocol television (IPTV) connection; a graphical user interface (GUI) viewable on the display device; and means for inputting a command to the GUI over the IPTV connection.

The means for inputting may comprise an Internet access device able to access the Internet, wherein the Internet access device is selected from a group of devices consisting of: a personal computer (PC), a laptop, an iPad, a tablet, a set top box, a smart phone, and an iPod. The Internet access device may access the Internet over a wired or wireless connection.

The Internet access device may comprise one or more input devices selected from the group of input devices consisting of a keyboard, a touch screen, a multiple touch screen, a mouse, a touchpad, a tablet input device, a voice input, a joystick, a nunchuk, a sensor bar, and a motion sensor.

The motion sensor may comprise one or more sensors in aggregate for: detection of motion in at least two directions; and detection of a "select" command.

The means for inputting may comprise a computer program executable by the display device, for performing one or more steps comprising: displaying the GUI on the display device; accepting one or more commands received over the IPTV connection; and navigating the GUI according to the accepted commands. The means for inputting may be stored as a computer program executable on a computer readable medium.

Alternatively, the means for inputting may comprise a computer program executable by the Internet access device, for performing one or more steps comprising: receiving an input from one or more of the input devices; translating the input into the command suitable for the GUI on the display device; and transmitting the command over the IPTV connection to the GUI on the display device. Again, the means for inputting may be stored as a computer program executable on a computer readable medium.

Another aspect of the invention is a method of controlling a display graphical user interface (GUI), comprising: providing a display; connecting the display to an Internet access through an Internet Protocol television (IPTV) connection; and controlling a graphical user interface (GUI) on the display through one or more IPTV commands. The method may further comprise displaying the GUI on the display.

The method may further comprise: providing an Internet access device selected from a group of devices consisting of: a personal computer (PC), a laptop, an iPad, a tablet, a set top box, a smart phone, an iPod; and transmitting one or more commands over IPTV from the Internet access device to the display GUI.

The method may still further comprise: providing one or more input devices connected to the Internet access device, wherein the input devices are selected from the group of input devices consisting of a keyboard, a touch screen, a multiple touch screen, a mouse, a touchpad, a tablet input device, a voice input, a joystick, a nunchuk, a sensor bar, and a motion sensor. The input devices may be connected to the Internet access device either wired or wirelessly.

The method may still further comprise translating, on the Internet access device, one or more inputs from the input devices into one or more of the commands suitable for controlling the GUI on the display. Additionally, the controlling step may be stored as a computer program executable on a computer readable medium.

The controlling the GUI on the display step may comprise: transmitting, from the Internet access device to the GUI on the display, a descriptor of the input device connected to the Internet access device; transmitting, from the input device to the display through the Internet access device over the IPTV connection, one or more inputs; translating, on the display, the one or more inputs into one or more translated commands comprising one or more of the IPTV commands; and executing, on the GUI on the display, the one or more translated commands; whereby the GUI on the display is controlled by the translated commands. The controlling the GUI on the display step may be stored as a computer program executable on a computer readable medium.

In yet another aspect of the invention, a method of Internet display control may comprise: providing an Internet protocol television (IPTV) connection between a display and an Internet access device; providing one or more inputs from an input device to the Internet access device; transmitting the one or more inputs from the Internet access device to the display over the IPTV connection; and thereby controlling a Graphical User Interface (GUI) on the display with the one or more inputs.

The method of Internet display control may further comprise: translating, on the display, the one or more inputs from the input device to one or more GUI commands; and controlling the GUI via the one or more GUI commands.

In another aspect of the invention, a system for IPTV graphical user interface control is disclosed, comprising: a display device with an Internet access through an Internet Protocol television (IPTV) connection; a graphical user interface (GUI) viewable on the display device; and an Internet access device with access the Internet over the IPTV connection; wherein the Internet access device and the display device are connected over the IPTV connection; and wherein a command entered on the Internet access device controls the GUI on the display device over the IPTV connection.

In yet another aspect of the invention, a display device for IPTV graphical user interface control is described, comprising: a display device with an Internet access through an Internet Protocol television (IPTV) connection; a graphical user interface (GUI) viewable on the display device; wherein the GUI on the display device is controlled by commands communicated over the IPTV connection.

The display device may further comprise: an Internet access device able to access the Internet over the IPTV connection; wherein the Internet access device and the display device are connected over the IPTV connection; and wherein a command entered on the Internet access device controls the GUI on the display device over the IPTV connection.

The display device may further comprise: one or more input devices connected to the Internet access device, wherein the input devices are selected from the group of input devices consisting of a keyboard, a touch screen, a multiple touch screen, a mouse, a touchpad, a tablet input device, a voice input, a joystick, a nunchuk, a sensor bar, and a motion sensor.

The input devices may be connected to the Internet access device either wired or wirelessly.

The Internet access device may have one or more inputs from the input devices that are translated into one or more of the commands suitable for controlling the GUI on the display.

The one or more inputs from the input devices may be translated into one or more of the commands suitable for controlling the GUI on the display by a computer program executable stored on a computer readable medium.

The Internet access device may be selected from a group of devices consisting of: a personal computer (PC), a laptop, an iPad, a tablet, a set top box, a smart phone, and an iPod.

In still another aspect of the invention, an Internet access device may comprise: an Internet access device with Internet access over an IPTV connection; one or more input devices connected to the Internet access device; and a computer program executable on the Internet access device, wherein a command entered on the Internet access device by one or more of the input devices generates commands transmitted over the IPTV connection.

The input devices may be selected from the group of input devices consisting of a keyboard, a touch screen, a multiple touch screen, a mouse, a touchpad, a tablet input device, a voice input, a joystick, a nunchuk, a sensor bar, and a motion sensor.

The Internet access device may further comprise: a display device connected to the Internet over another IPTV connection; wherein the Internet access device and the display device are connected over the IPTV connection; and wherein the generated commands of the Internet access device are transmitted over the IPTV connection to the display device to control a graphical user interface (GUI) resident on the display device.

The input devices may be connected to the Internet access device either wired or wirelessly.

The Internet access device may have one or more inputs from the input devices that are translated into one or more of the commands suitable for controlling the GUI on the display.

The command from the input device may be translated into one or more of the commands suitable for controlling the GUI on the display by a computer program executable stored on a computer readable medium.

The Internet access device may be selected from a group of devices consisting of: a personal computer (PC), a laptop, an iPad, a tablet, a set top box, a smart phone, and an iPod.

The Internet access device computer program executable may be stored on a computer readable medium.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
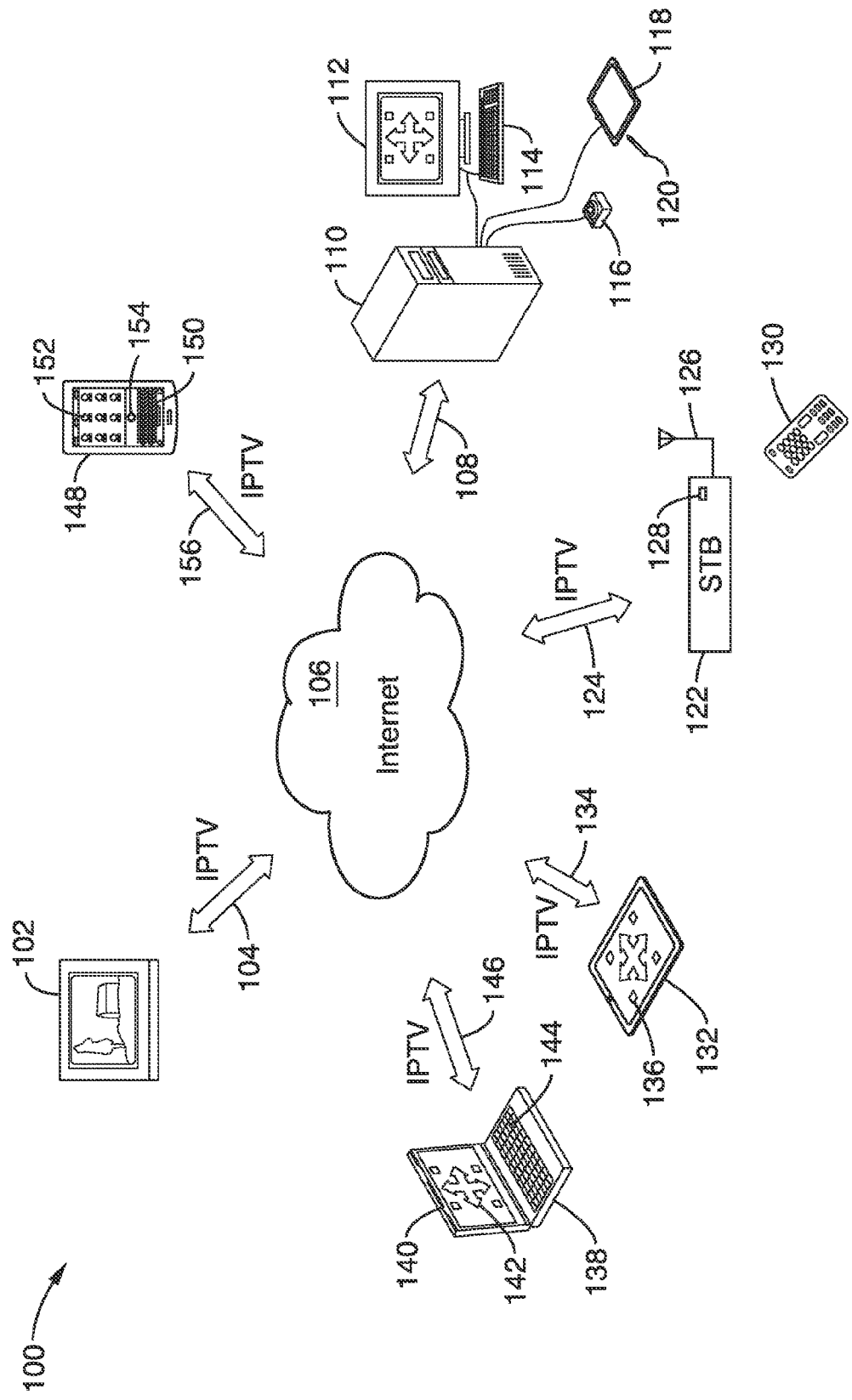
FIG. 1 is a diagram of a display controlled by an Internet protocol television (IPTV) connection to an Internet access device with one or more input devices.

Refer now to FIG. 1, which is a diagram 100 of a display 102 controlled by an Internet protocol television (IPTV) 104 connection over an Internet 106 connection to an Internet access device with one or more input devices.

In one embodiment, a continuing IPTV connection 108 connects with a representative personal computer (PC) 110. The PC 110 may have a display 112 (which may, or may not, be touch sensitive), a keyboard 114 (with or without a numeric entry pad), a mouse 116, and a tablet 118 input with or without a stylus 120 input. The display 112, if touch sensitive, may act as an input device, as may the keyboard 114, the mouse 116, and the tablet 118.

By using software resident on the PC 110 the various input devices (e.g. touch sensitive screen if present, keyboard 114, mouse 116, or tablet 118) connected to the PC 110 may be used to command the display 102 over the IPTV connections 104 and 108 to and from the Internet 106.

A set top box (STB) 122 may also connect to the Internet 106 over an IPTV connection 124. The STB 122 may have inputs via a wireless antenna 126 or an infrared input 128, from a remote controller 130. Therefore, the remote controller 130 may also use either radio frequency wireless or infrared communications. The STB 122 would need to be able to establish an IPTV 124 communications link to the display 102, by means of software resident on the STB 122.

A tablet device 132, such as an iPad™, may also connect to the Internet 106 via still another IPTV link 134. The tablet device 132 would generally be able to connect to the Internet 106 via software resident on the tablet device 132. A tablet graphic user interface 136 (which may also incorporate a virtual remote or keyboard) may also run on the tablet device 132, whereby the display 102 would be controlled over the IPTV connections 104 and 134 present between them by indicating actions to be taken on the tablet graphic user interface 136. The tablet device 132 may also comprise a virtual keyboard (as part of the tablet graphic user interface 136) on a touch screen, whereby inputs from the touch screen are used to control the display 102 via IPTV connections 104 and 134.

Similarly, a laptop computer 138, or netbook, with a display 140, laptop graphical user interface 142, and keyboard 144, would able to access the Internet 106 through still another IPTV connection 146. By using the laptop computer 138, the display 102 could be controlled over the IPTV link 104 and the IPTV connection 146 between them. In this instance, software present on the laptop computer 138 would act as a laptop graphical user interface 142 for control of the display 102 via IPTV connections 104 and 146.

In one final non-limiting example, a smart phone 148 may have one or more input devices consisting of a keyboard 150, a display 152 (if touch screen capable), and a trackball or track pad 154. The smart phone 148 may also communicate over an IPTV link 156 to the Internet 106, where the display 102 is controlled by its IPTV connection 104 to the Internet 106. Additional input devices resident on the smart phone 148 may include motion sensors, accelerometers, GPS sensors, and voice inputs. The smart phone 148 may also run a resident application (a display 152 graphical or non-graphical user interface, not shown here) that performs functions of observing the various input devices, and transmitting inputs from the input devices to the display 102.

The Internet access device (e.g. PC 110, STB 122, tablet device 132, laptop computer 138, smart phone 148) may replace what would otherwise be a more traditionally remote control (not shown here), and would allow navigation of a GUI resident on the display 102 by passing commands over an IPTV connection to the Internet 106, and thence to the display 102 through a wired or wireless IPTV connection.

There are few limitations to the possible Internet access devices that may be used, so long as access to an IPTV connection (e.g. 104, 108, 124, 134, 146, and 156) is possible with a given display 102 via the Internet 106.

Increasingly televisions, particularly high definition televisions (HDTVs), support Internet access capability. Using Internet access and IPTV protocols as described above, such an HDTV (also termed a display herein) could be navigated and controlled by using IPTV commands to the HDTV (the display 102 GUI) seamlessly through the appropriate IPTV connection.

Figure 2:
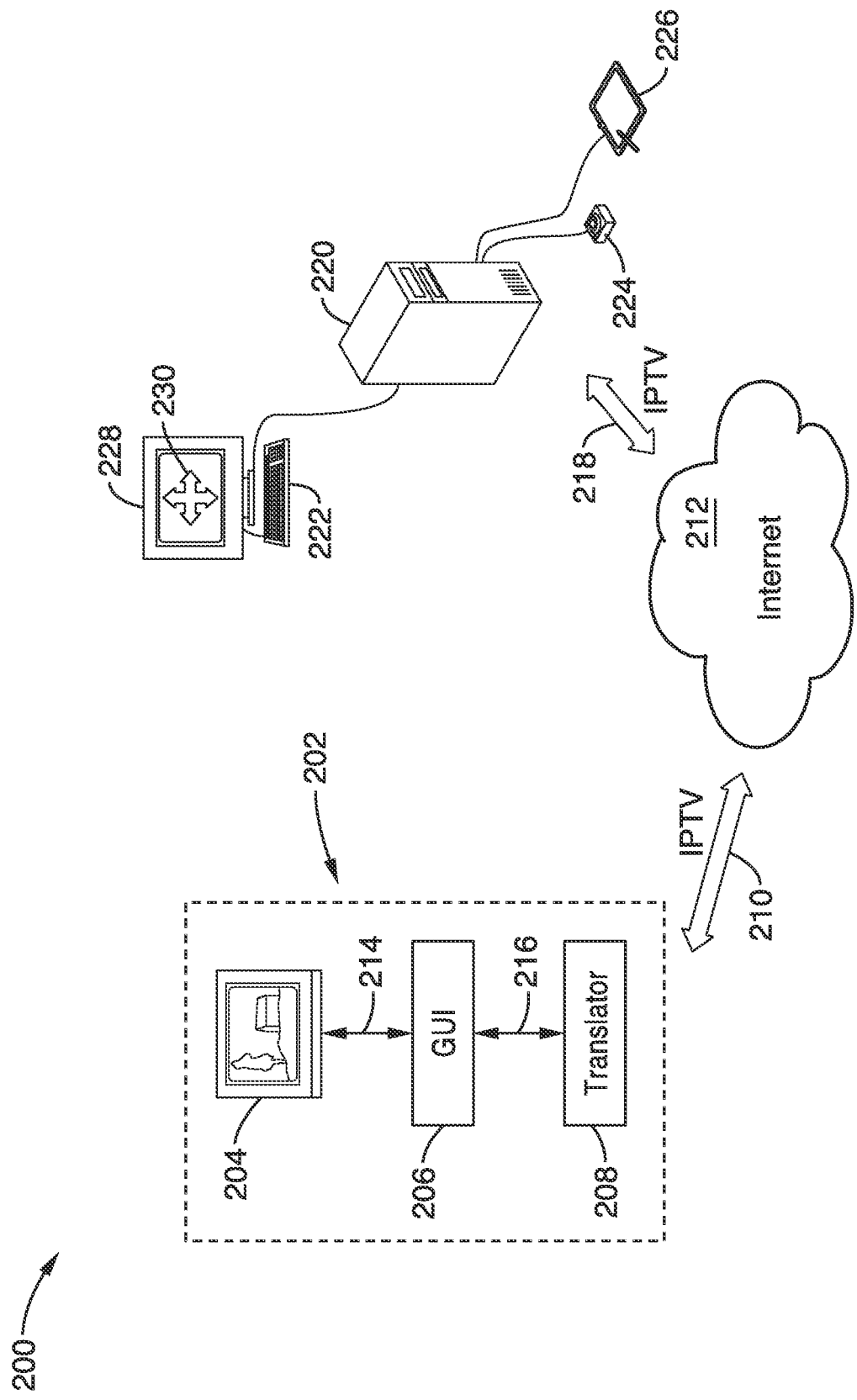
FIG. 2 is a diagram of a display controlled by an IPTV connection, where the display has a translator module to translate commands from an Internet access device to the graphical user interface (GUI) present on the display.

Refer now to FIG. 2, which is a diagram 200 of a display 202 comprising a monitor 204, a graphical user interface (GUI) 206, and a translator module 208. The display 202 is controlled by an IPTV connection 210, where the display 202 has a translator module 208 to translate incoming commands from the Internet 212. The graphical user interface (GUI) 206 controls screens on the monitor 204, and may also pass commands over a hardware link 214 to the monitor 204, directing the monitor 204 to change channels, input sources, frame rates, pixel sizes, etc. characteristic to the display of images or video present on the monitor 204.

Incoming commands from the Internet 212 pass through the IPTV connection 210 to the translator module 208, where information about the input device, the input commands, etc. are processed into virtual key code commands which are sent 216 to the GUI 206 in the display 202. For example, if a keyboard up and down arrow are used to increase or decrease either channel numbers or volume, then appropriate keyboard up arrows ↑ or down arrows ↓ would be mapped into an appropriate respective increase or decrease.

An additional IPTV connection 218 could connect, as a nonlimiting example, a personal computer 220 to the Internet 212. The personal computer (PC) 220 may have a variety of input devices, such as keyboard 222, mouse 224, and tablet input 226.

The PC 220 may have a computer monitor 228, upon which a user interface 230 may be displayed. Controls by one or more of the input devices may be used as inputs to the user interface 230, which are in turn relayed over the additional IPTV connection 218 to the Internet 212, thence to the IPTV connection 210 to the display 202.

Figure 3:
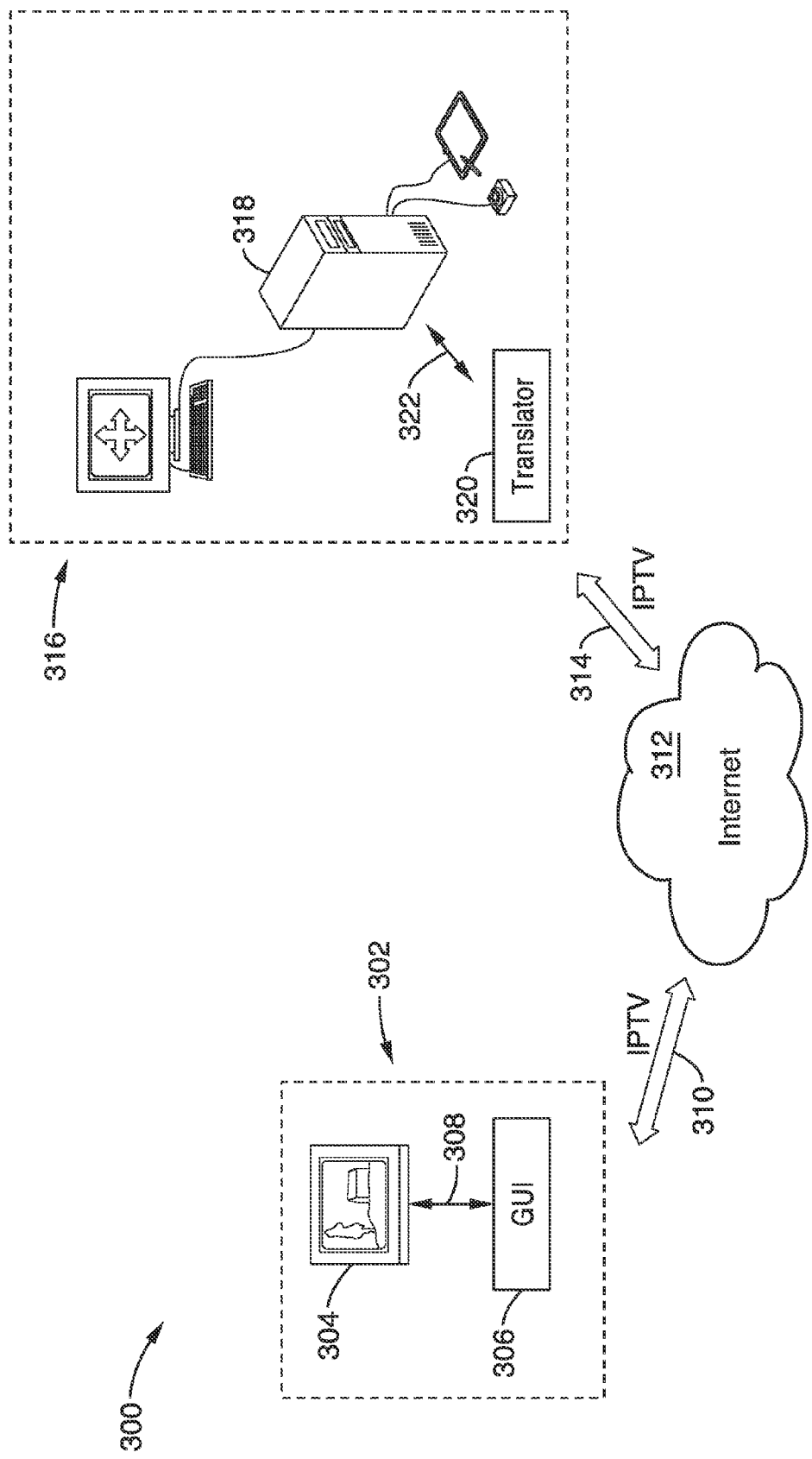
FIG. 3 is a diagram of a display controlled by an IPTV connection, where the Internet access device has a translator module to send translated commands over Internet protocol television (IPTV) to the graphical user interface (GUI) present on the display.

Refer now to FIG. 3, which is a diagram 300 of a display 302 comprising a monitor 304, and a graphical user interface (GUI) 306. The GUI 306 controls via a hardware connection 308 what is displayed on the monitor 304, as well as changes channels, inputs, and volume controls. The display 302 would be controlled by an IPTV connection 310 by incoming commands from the Internet 312. The graphical user interface (GUI) 306 controls screens on the monitor 304, and may also pass commands over a hardware connection 308 to the monitor 304, directing the monitor to change channels, input sources, frame rates, pixel sizes, etc. characteristic to the display of images or video present on the monitor 304.

Incoming commands from the Internet 312 would pass through the IPTV connection 310 to the GUI 306, which would then direct the display 302 over the hardware connection 308 to change as desired.

Note that in FIG. 3, there is no translator module 208 previously described in FIG. 2. Here, commands are assumed to be input to the GUI 306 in an input device independent manner.

Another IPTV connection 314 connects a personal computer system 316 to the Internet 312. Here, the personal computer 318 passes inputs from various input devices to a translator module 320 through either a software or hardware link 322 prior to transmission of inputs from the input devices through the IPTV connection 314, the Internet 312, and ultimately to the display 302 GUI 306.

The translator module 320 uses information about the particular input device to translate the input commands into commands to be sent 314 to the GUI 306 and thence over the hardware connection 308 to the display 302. For example, in a keyboard input device, the up and down arrows may be used to increase or decrease channels or volume, then appropriate keyboard up arrows ↑ or down arrows ↓ would be mapped into an increase or decrease, respectively display 302 controls resident in the GUI 306.

In this way, regardless of the input device, commands universal to the display 302 GUI 306 are presented. This method actually makes much sense, as each Internet access device, such as a PC 318, may have drivers or other application software that translates their respective input devices into GUI 306 command equivalents.

Referring back to FIG. 1, although not shown here, other smart phones 148, such as iPhones, Droids, BlackBerry smart phones, etc. may have direct access to the Internet 106. By writing device dependent applications for these devices, finger swipes, keyboards, track pads, and the like may be used to control a display 102 by direct IPTV connection 104 over the Internet 106. Additionally, dedicated remote controls may be used to control display 102 GUIs from the remote input devices.

DISCUSSION

The "input device—to Internet access device—to IPTV connection" functionality could be implemented as a software solution without additional hardware cost, or at least minimal additional cost. Various Internet access devices (e.g. PC, laptop, smart phone, tablet device) comprising various input devices (e.g. mouse, keyboard, tablet with virtual keypad on a touch screen, without limitation), could be used to control a display via IPTV by going through an IPTV to Internet to IPTV connection by implementing an appropriate client-server interface.

These various IPTV connections would implement a software stack that could be activated to listen to an input device via its Internet access device over the IPTV connection from a network TCP/IP stack as a client. As the client screen device (e.g. IPTV) receives a key code from network, it would convert or translate the received key code to a proper internal key code, e.g. various integrated remote control system keys, such as the Sony Integrated Remote Control System (SIRCS), mouse pointer, or touch screen multipoint access.

An input device could be activated as a network server and the other screen device or IPTV could be activated as an associated client, where the server would pass designed key input protocols to share and control the input focus and screen GUI activities on its associated client devices.

This method would provide a central input control mechanism for multiple screens on various devices by using a server-client IPTV connection.

The input device may allow the GUI to activate or deactivate the input device control with the network connection of each individual client device.

The target client device or IPTV may also provide the proper GUI setup to enable and disable the external input device listener software that may connect and disconnect with the server device.

The input device may provide a mechanism to scan available displays (e.g. IPTV, PC) on a list where a user may choose the focus of input source by switching the focus on the GUI of each display. In this manner, the input device could cross multiple displays by changing the input device focus on the target screen.

This invention may be particularly useful for input devices such as PCs, tablets, IP cellular phones that already have the Internet or LAN access capability, as they may control over IPTV a remote GUI through TCP/IP protocols without any additional hardware cost other than the implementation of an appropriate IPTV control and interface software stack.

Through the Internet, directly on the display, or via IPTV, manufacturers may be able to download updates for improvements to the input device functionality or GUI software to change the control and interface mechanism. In this manner, even enhanced new application features (e.g. gaming) could be downloaded.

The input device vendor may choose to provide such features as a service promotion in a business sense. Such service promotions may help to more easily introduce, or more rapidly increase market share of, new applications associated with new remote input devices.

This invention would also extend the capability of HDTVs or other displays with Internet access to other Internet access devices.

CONCLUSION

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. A display apparatus, comprising: a display device configured for Internet access through an Internet Protocol television (IPTV) connection; a graphical user interface (GUI) viewable on the display device; and means for inputting a command to the GUI over the IPTV connection.

2. The apparatus of embodiment 1, wherein the means for inputting comprises: an Internet access device configured to access the Internet, wherein the Internet access device is selected from a group of devices consisting of: a personal computer (PC), a laptop, an iPad, a tablet, a set top box, a smart phone, and an iPod.

3. The apparatus of embodiment 2, wherein the Internet access device accesses the Internet over a wired or wireless connection.

4. The apparatus of embodiment 2, wherein the Internet access device comprises one or more input devices selected from the group of input devices consisting of a keyboard, a touch screen, a multiple touch screen, a mouse, a touchpad, a tablet input device, a voice input, a joystick, a nunchuk, a sensor bar, and a motion sensor.

5. The apparatus of embodiment 4, wherein the motion sensor comprises: one or more sensors in aggregate for: detection of motion in at least two directions; and detection of a "select" command.

6. The apparatus of embodiment 1, wherein the means for inputting comprises a computer program executable by the display device, for performing one or more steps comprising: displaying the GUI on the display device; accepting one or more commands received over the IPTV connection; and navigating the GUI according to the accepted commands.

7. The apparatus of embodiment 6, wherein the means for inputting is stored as a computer program executable on a computer readable medium.

8. The apparatus of embodiment 4, wherein the means for inputting comprises a computer program executable by the Internet access device, for performing one or more steps comprising: receiving an input from one or more of the input devices; translating the input into the command suitable for the GUI on the display device; and transmitting the command over the IPTV connection to the GUI on the display device.

9. The apparatus of embodiment 8, wherein the means for inputting is stored as a computer program executable on a computer readable medium.

10. A method of controlling a display graphical user interface (GUI), comprising: providing a display; connecting the display to an Internet access through an Internet Protocol television (IPTV) connection; and controlling a graphical user interface (GUI) on the display through one or more IPTV commands.

11. The method of embodiment 10, further comprising: displaying the GUI on the display.

12. The method of embodiment 10, further comprising: providing an Internet access device selected from a group of devices consisting of: a personal computer (PC), a laptop, an iPad, a tablet, a set top box, a smart phone, an iPod; and transmitting one or more commands over IPTV from the Internet access device to the display GUI.

13. The method of embodiment 12, further comprising: providing one or more input devices connected to the Internet access device, wherein the input devices are selected from the group of input devices consisting of a keyboard, a touch screen, a multiple touch screen, a mouse, a touchpad, a tablet input device, a voice input, a joystick, a nunchuk, a sensor bar, and a motion sensor.

14. The method of embodiment 13, wherein the input devices are connected to the Internet access device either wired or wirelessly.

15. The method of embodiment 13, further comprising: translating, on the Internet access device, one or more inputs from the input devices into one or more of the commands suitable for controlling the GUI on the display.

16. The method of embodiment 15, wherein the controlling step is stored as a computer program executable on a computer readable medium.

17. The method of embodiment 14, wherein the controlling the GUI on the display step comprises: transmitting, from the Internet access device to the GUI on the display, a descriptor of the input device connected to the Internet access device; transmitting, from the input device to the display through the Internet access device over the IPTV connection, one or more inputs; translating, on the display, the one or more inputs into one or more translated commands comprising one or more of the IPTV commands; and executing, on the GUI on the display, the one or more translated commands; whereby the GUI on the display is controlled by the translated commands.

18. The method of embodiment 17, wherein the controlling the GUI on the display step is stored as a computer program executable on a computer readable medium.

19. A method of Internet display control, comprising: providing an Internet protocol television (IPTV) connection between a display and an Internet access device; providing one or more inputs from an input device to the Internet access device; transmitting the one or more inputs from the Internet access device to the display over the IPTV connection; and thereby controlling a Graphical User Interface (GUI) on the display with the one or more inputs.

20. The method of Internet display control of embodiment 19, further comprising: translating, on the display, the one or more inputs from the input device to one or more GUI commands; and controlling the GUI via the one or more GUI commands.

21. A system for IPTV graphical user interface control, comprising: a display device configured for Internet access through an Internet Protocol television (IPTV) connection; a graphical user interface (GUI) viewable on the display device; and an Internet access device configured for access the Internet over the IPTV connection; wherein the Internet access device and the display device are configured for connection over the IPTV connection; and wherein a command entered on the Internet access device controls the GUI on the display device over the IPTV connection.

22. A display device for IPTV graphical user interface control, comprising: a display device configured for Internet access through an Internet Protocol television (IPTV) connection; a graphical user interface (GUI) viewable on the display device; wherein the GUI on the display device is controlled by commands communicated over the IPTV connection.

23. The display device recited in claim 22, comprising: an Internet access device configured for access to the Internet over the IPTV connection; wherein the Internet access device and the display device are configured for connection over the IPTV connection; and wherein a command entered on the Internet access device controls the GUI on the display device over the IPTV connection.

24. The display device recited in claim 23, further comprising: one or more input devices connected to the Internet access device, wherein the input devices are selected from the group of input devices consisting of a keyboard, a touch screen, a multiple touch screen, a mouse, a touchpad, a tablet input device, a voice input, a joystick, a nunchuk, a sensor bar, and a motion sensor.

25. The display device recited in claim 24, wherein the input devices are connected to the Internet access device either wired or wirelessly.

26. The display device recited in claim 24, wherein in the Internet access device, one or more inputs from the input devices are translated into one or more of the commands suitable for controlling the GUI on the display.

27. The display device recited in claim 26, wherein the one or more inputs from the input devices are translated into one or more of the commands suitable for controlling the GUI on the display by a computer program executable stored on a computer readable medium.

28. The display device recited in claim 23, wherein the Internet access device is selected from a group of devices consisting of: a personal computer (PC), a laptop, an iPad, a tablet, a set top box, a smart phone, and an iPod.

29. An Internet access device, comprising: an Internet access device configured for Internet access over an IPTV connection; one or more input devices connected to the Internet access device; and a computer program executable on the Internet access device, wherein a command entered on the Internet access device by one or more of the input devices generates commands transmitted over the IPTV connection.

30. The Internet access device recited in claim 29, wherein the input devices are selected from the group of input devices consisting of a keyboard, a touch screen, a multiple touch screen, a mouse, a touchpad, a tablet input device, a voice input, a joystick, a nunchuk, a sensor bar, and a motion sensor 31. The Internet access device recited in claim 29, further comprising: a display device configured for connection to the Internet over another IPTV connection; wherein the Internet access device and the display device are configured for connection over the IPTV connection; and wherein the generated commands of the Internet access device are transmitted over the IPTV connection to the display device to control a graphical user interface (GUI) resident on the display device.

32. The Internet access device recited in claim 29, wherein the input devices are connected to the Internet access device either wired or wirelessly.

33. The Internet access device recited in claim 31, wherein in the Internet access device, one or more inputs from the input devices are translated into one or more of the commands suitable for controlling the GUI on the display.

34. The Internet access device recited in claim 31, wherein the command from the input device is translated into one or more of the commands suitable for controlling the GUI on the display by a computer program executable stored on a computer readable medium.

35. The Internet access device recited in claim 23, wherein the Internet access device is selected from a group of devices consisting of: a personal computer (PC), a laptop, an iPad, a tablet, a set top box, a smart phone, and an iPod.

36. The Internet access device recited in claim 29, wherein the computer program executable is stored on a computer readable medium.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of controlling a display graphical user interface (GUI), comprising:
    (a) providing a display;
    (b) connecting the display to an Internet access through an Internet Protocol television (IPTV) connection;
    (c) controlling a graphical user interface (GUI) on the display through one or more IPTV commands;
    (d) displaying the GUI on the display;
    (e) providing an Internet access device;
    (f) transmitting one or more commands over IPTV from the Internet access device to the display GUI;
    (g) providing one or more input devices connected to the Internet access device;
    (h) wherein the controlling the GUI on the display step comprises:
        (1) transmitting, from the Internet access device to the GUI on the display, a descriptor of the input device connected to the Internet access device;
        (2) transmitting, from the input device to the display through the Internet access device over the IPTV connection, one or more inputs;
        (3) translating, on the display, the one or more inputs into one or more translated commands comprising one or more of the IPTV commands; and
        (4) executing, on the GUI on the display, the one or more translated commands;
        (5) whereby the GUI on the display is controlled by the translated commands.

2. The method recited in claim 1, wherein the Internet access device is selected from a group of devices consisting of: a personal computer (PC), a laptop, an iPad, a tablet, a set top box, a smart phone, and an iPod.

3. The method recited in claim 1, wherein the input devices are selected from a group of input devices consisting of a keyboard, a touch screen, a multiple touch screen, a mouse, a touchpad, a tablet input device, a voice input, a joystick, a nunchuk, a sensor bar, and a motion sensor.

4. The method recited in claim 1, wherein the input devices are connected to the Internet access device either wired or wirelessly.

5. The method recited in claim 1, further comprising:
    translating, on the Internet access device, one or more inputs from the input devices into one or more of the commands suitable for controlling the GUI on the display.

6. The method recited in claim 5, wherein the controlling step is stored as a computer program executable on a computer readable medium.

7. The method recited in claim 1, wherein the controlling the GUI on the display step is stored as a computer program executable on a computer readable medium.

\* \* \* \* \*